United States Patent
Avivi et al.

(10) Patent No.: US 10,284,332 B2
(45) Date of Patent: *May 7, 2019

(54) SPUR CANCELATION USING INVERSE SPUR INJECTION

(71) Applicant: Intel IP Corporation, Santa Clara, CA (US)

(72) Inventors: Rotem Avivi, Petah-Tiqwa (IL); Michael Kerner, Tel Mond (IL); Assaf Gurevitz, Ramat Hasharon (IL)

(73) Assignee: Intel IP Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/449,078

(22) Filed: Mar. 3, 2017

(65) Prior Publication Data
US 2018/0254852 A1 Sep. 6, 2018

(51) Int. Cl.
| H04L 1/18 | (2006.01) |
| H04L 1/00 | (2006.01) |
| H04B 1/40 | (2015.01) |
| H04L 27/00 | (2006.01) |
| H04B 1/04 | (2006.01) |
| H04B 1/525 | (2015.01) |
| H04B 7/0404 | (2017.01) |

(52) U.S. Cl.
CPC ......... *H04L 1/0033* (2013.01); *H04B 1/0475* (2013.01); *H04B 1/40* (2013.01); *H04B 1/525* (2013.01); *H04L 1/0036* (2013.01); *H04L 27/0002* (2013.01); *H04B 7/0404* (2013.01)

(58) Field of Classification Search
None
See application file for complete search history.

(56) References Cited

U.S. PATENT DOCUMENTS

| 4,015,083 | A | 3/1977 | Bellisio |
| 7,123,892 | B2 | 10/2006 | Li et al. |
| 8,249,207 | B1 | 8/2012 | Hissen et al. |
| 9,172,570 | B1 * | 10/2015 | Li Puma ................ H04L 27/04 |
| 9,257,999 | B1 | 2/2016 | Vilhonen |
| 2005/0147025 | A1 * | 7/2005 | Auer ................... H04B 7/0684 370/203 |

(Continued)

OTHER PUBLICATIONS

Notice of Allowance dated Aug. 28, 2017 in connection with U.S. Appl. No. 15/164,056.

(Continued)

*Primary Examiner* — Mujtaba M Chaudry
(74) *Attorney, Agent, or Firm* — Eschweiler & Potashnik, LLC

(57) ABSTRACT

A spur cancelation system includes error circuitry, inverse spur circuitry, and injection circuitry. The error circuitry is configured to generate an error signal based at least on a first transceiver signal in a transceiver signal processing chain. The inverse spur circuitry is configured to, based at least on the error signal, determine a gain and a phase of a spur signal in the transceiver signal and generate an inverse spur signal based at least on the gain and the phase of the spur signal. The injection circuitry is configured to inject the inverse spur signal to cancel a spur in a second transceiver signal in the transceiver signal processing chain.

17 Claims, 3 Drawing Sheets

(56) References Cited

U.S. PATENT DOCUMENTS

| | | | |
|---|---|---|---|
| 2008/0108310 A1* | 5/2008 | Tong | H04B 7/0617 |
| | | | 455/69 |
| 2008/0181342 A1* | 7/2008 | Cho | H04B 7/0413 |
| | | | 375/347 |
| 2012/0201153 A1 | 8/2012 | Bharadia et al. | |
| 2013/0225097 A1* | 8/2013 | Hong | H04B 15/00 |
| | | | 455/77 |
| 2015/0009866 A1 | 1/2015 | Sundstroem et al. | |
| 2015/0145567 A1* | 5/2015 | Perrott | H03L 7/093 |
| | | | 327/156 |
| 2015/0294667 A1* | 10/2015 | Kim | G10L 21/034 |
| | | | 704/233 |
| 2016/0300563 A1* | 10/2016 | Park | G10K 11/17853 |
| 2017/0041039 A1 | 2/2017 | Hwang et al. | |

OTHER PUBLICATIONS

Li Puma, G. et al. "Mitigation of Oscillator Pulling in SoCs," IEEE Journal of Solid-State Circuits, vol. 51, No. 2, Feb. 2016, pp. 348-356.

Li Puma, G. et al. "Adaptive Techniques to Mitigate Oscillator Pulling in Radio Transmitters." DOI 101.1109/TCSII.2016. 2552143. IEEE Transactions on Circuits and Systems II: Express Briefs, pp. 1-5.

U.S. Appl. No. 15/164,056, filed May 25, 2016.

International Search Report dated May 8, 2018 for International Application PCT/US2018/016140.

\* cited by examiner

SPUR CANCELATION USING INVERSE SPUR INJECTION

FIELD

The present disclosure relates to the field of wireless transmitters and in particular to methods and apparatus for reducing the impact of spurs in transmitted and received signals.

BACKGROUND

Spurs are unintended signals that are generated during signal processing. For example, non-linearities in radio frequency (RF) components in a transceiver may generate spurs which degrade the transceiver's performance or violate regulatory requirements.

BRIEF DESCRIPTION OF THE DRAWINGS

Some examples of circuits, apparatuses and/or methods will be described in the following by way of example only. In this context, reference will be made to the accompanying figures.

DETAILED DESCRIPTION

Figure 1:
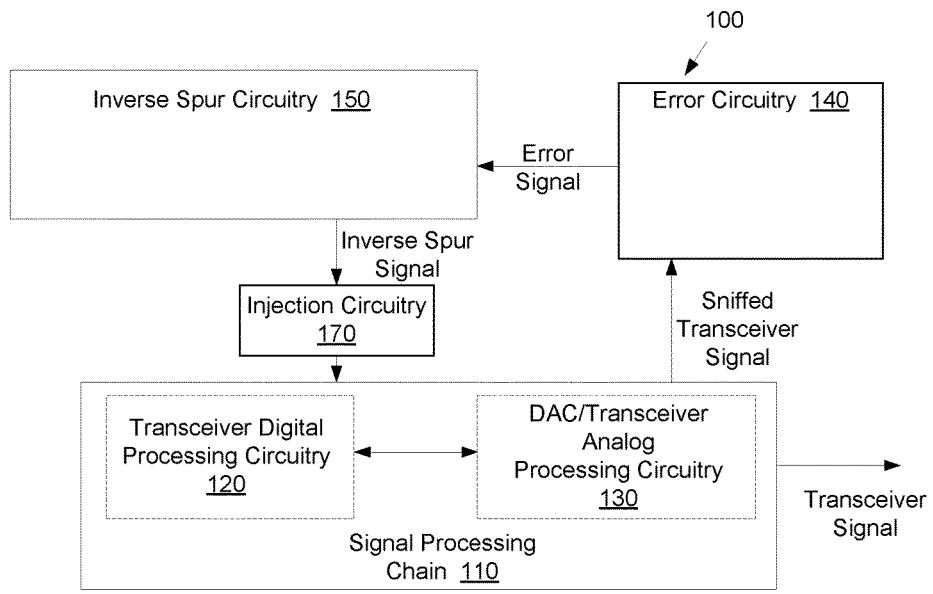
FIG. 1 illustrates an exemplary transmitter architecture that includes an inverse spur system configured to generate an inverse spur signal to cancel a spur in a transmit or receive signal.

Transceiver RF components (like DAC, mixers, and so on) in the transmit signal processing chain and/or the receive signal processing chain might cause spurs that degrade the transceiver's performance, violate regulatory requirements, and/or interfere with other sub-systems in the transceiver's vicinity. Prior art approaches to mitigating spurs are based on conventional RF techniques (e.g. RF/analog notch filtration). Filter based approaches usually can only attenuate spurs by several dB and also sometimes degrade the transceiver's performance because the wanted signal is also subject to filtration.

Described herein are systems, methods, and circuitries that mitigate or cancel spurs by injecting an externally generated correction term (called the "inverse spur signal") to a transceiver signal chain. The inverse spur signal is generated to match an expected spur in the transceiver signal. The inverse spur signal is determined such that the resulting sum (spur in transceiver signal+inverse spur signal) will go zero. The inverse spur signal is determined to have the same gain and phase as the expected spur (or, alternatively, the same gain and inverse phase of the expected spur). Described herein are also systems, methods, and circuitries that find the phase and gain of an expected spur.

The present disclosure will now be described with reference to the attached figures, wherein like reference numerals are used to refer to like elements throughout, and wherein the illustrated structures and devices are not necessarily drawn to scale. As utilized herein, terms "module", "component," "system," "circuit," "element," "slice," "circuitry," and the like are intended to refer to a set of one or more electronic components, a computer-related entity, hardware, software (e.g., in execution), and/or firmware. For example, circuitry or a similar term can be a processor, a process running on a processor, a controller, an object, an executable program, a storage device, and/or a computer with a processing device. By way of illustration, an application running on a server and the server can also be circuitry. One or more circuits can reside within the same circuitry, and circuitry can be localized on one computer and/or distributed between two or more computers. A set of elements or a set of other circuits can be described herein, in which the term "set" can be interpreted as "one or more."

As another example, circuitry or similar term can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, circuitry can be an apparatus that provides specific functionality through electronic components without mechanical parts; the electronic components can include one or more processors therein to execute software and/or firmware that confer(s), at least in part, the functionality of the electronic components.

It will be understood that when an element is referred to as being "electrically connected" or "electrically coupled" to another element, it can be physically connected or coupled to the other element such that current and/or electromagnetic radiation (e.g., a signal) can flow along a conductive path formed by the elements. Intervening conductive, inductive, or capacitive elements may be present between the element and the other element when the elements are described as being electrically coupled or connected to one another. Further, when electrically coupled or connected to one another, one element may be capable of inducing a voltage or current flow or propagation of an electro-magnetic wave in the other element without physical contact or intervening components. Further, when a voltage, current, or signal is referred to as being "applied" to an element, the voltage, current, or signal may be conducted to the element by way of a physical connection or by way of capacitive, electromagnetic, or inductive coupling that does not involve a physical connection.

Use of the word exemplary is intended to present concepts in a concrete fashion. The terminology used herein is for the purpose of describing particular examples only and is not intended to be limiting of examples. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

In the following description, a plurality of details is set forth to provide a more thorough explanation of the embodiments of the present disclosure. However, it will be apparent to one skilled in the art that embodiments of the present disclosure may be practiced without these specific details. In other instances, well-known structures and devices are shown in block diagram form rather than in detail in order to avoid obscuring embodiments of the present disclosure. In addition, features of the different embodiments described hereinafter may be combined with each other, unless specifically noted otherwise.

FIG. 1 illustrates an exemplary transceiver architecture 100 that includes a spur cancelation system. The transceiver architecture includes a signal processing chain 110 with digital processing circuitry 120 and analog processing circuitry 130. For the purposes of this description, a "signal processing chain" is a set or series of electronic components that process, manipulate, or otherwise act upon a signal as the signal flows through the chain of electronic components. For example, a transmit signal processing chain includes components that process a digital signal encoding information to generate a RF analog signal that encodes the information for transmission to another transceiver. Likewise a receive signal processing chain includes components that convert a received RF analog signal to a digital baseband signal that carries encoded information.

Due to the operation of the components within a signal processing chain, the signal being processed by the chain will itself be modified and will differ in some aspects at various points in the chain. However, for the purposes of this description, the term "signal" when used in reference to a signal flowing through a processing chain may refer to the signal in any form at any stage of alteration and is not limited to the signal any particular point in the signal processing chain. For example, when a digital signal is processed by a digital to analog converter to generate an analog version of the digital signal, both the digital signal and the analog signal may be both referred to as the "signal" that is processed by a processing chain.

The digital processing circuitry 120 may be referred to as "baseband" components that act on a transceiver signal in a baseband frequency or digital domain. The analog processing circuitry 130 may be referred to as RF or "front end" components that act on a transceiver in the analog domain at an RF carrier frequency, or optionally, an intermediate frequency. Recall that spurs are unintended or unwanted signals that are generated by the analog processing circuitry 130 and are embedded in the analog signal output by the analog processing components. In a transmit signal processing chain, the analog signal output by the analog processing circuitry is amplified and transmitted by way of an antenna. In a receive signal processing chain, the analog signal output by the analog processing circuitry is down converted to the baseband frequency to generate a digital signal that is processed by the digital processing circuitry.

The transceiver 100 includes a spur cancelation system that includes an error circuitry 140, an inverse spur circuitry, and injection circuitry 170. Recall that the spur cancelation system generates an inverse spur signal that mimics an expected spur that is present in the transceiver signal. The inverse spur signal is subtracted from the transceiver signal to cancel the spur from the transceiver signal. Alternatively, the inverse spur signal may be generated to have a phase that is 180 degrees out of phase with the spur signal, in which case the inverse spur signal is added to, rather than subtracted from, the transceiver signal.

The exemplary error circuitry 140 is configured to generate an error signal based at least on a first transceiver signal in the transceiver signal processing chain 110. The first transceiver signal will usually be an analog signal because spurs are generated in by analog components like DACs and mixers. However, the first transceiver signal could be digital signal that includes a spur component that is to be canceled. The error signal will usually be a digital signal so that digital signal processing techniques may be used to generate the inverse spur signal from the error signal. However, the error signal could be an analog signal that may or may not be converted to a digital signal for use in generating the inverse spur signal.

The inverse spur circuitry 150 is configured to generate an inverse spur signal based at least on the error signal. When the error signal represents a spur that is present in the transceiver signal, the inverse spur circuitry 150 is configured to generate an inverse spur signal phase and gain that matches the phase and gain of the error signal (i.e., spur). The inverse spur signal is described herein as a digital signal because it may be advantageous to perform the computations to generate the inverse spur signal with digital components. However an inverse spur signal may be generated using any appropriate components, including analog circuitry.

The injection circuitry 170 is configured to inject or combine the inverse spur signal into a second transceiver signal in the transceiver signal processing chain. In the described system, the inverse spur signal and the second signal are both digital signals. However, the inverse spur signal may be converted to an analog signal by a digital to analog converter (DAC) (not shown) in the injection circuitry 170 prior to being injected into an analog second transceiver signal. This use of an analog inverse spur signal is appropriate for canceling spurs in a receive signal processing chain (not shown). In the receive signal processing chain, the analog inverse spur signal may be injected into a low noise amplifier (LNA) or mixer ports in the receive signal processing chain.

Figure 2:
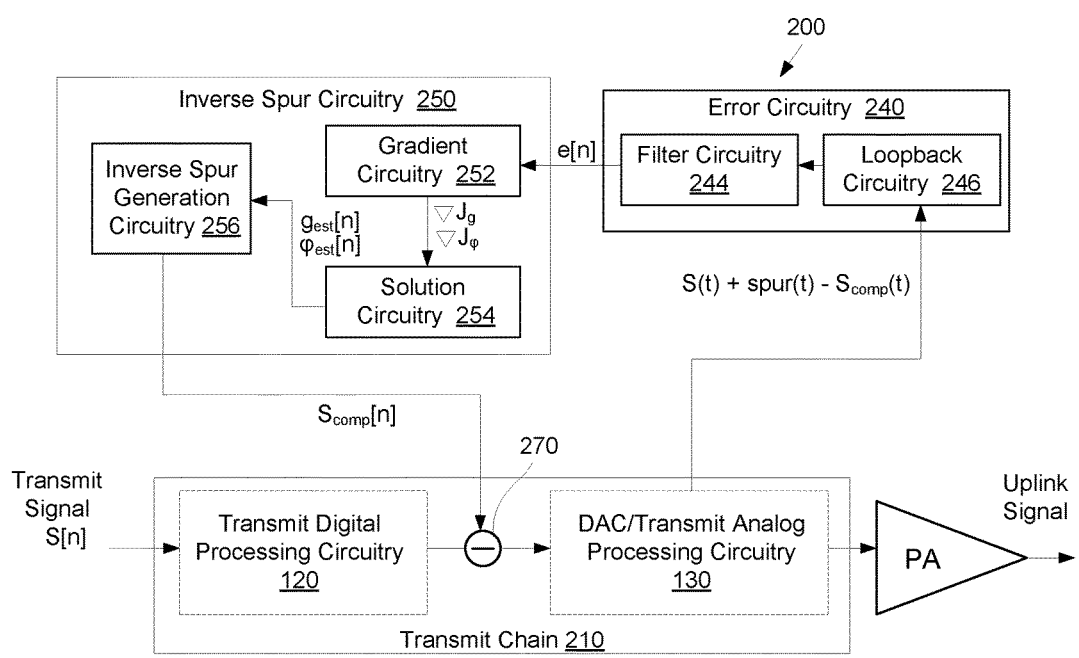
FIG. 2 illustrates an exemplary transmitter architecture that includes an inverse spur system configured to generate an inverse spur signal to cancel a spur in a transmit signal.

FIG. 2 illustrates a transmitter architecture 200 that includes a transmit chain 210 and an exemplary spur cancelation system that operates in the digital domain. As described with reference to FIG. 1, the spur cancelation system 200 includes error circuitry 240 that "sniffs" or samples the transmit signal $(S(t)+spur-S_{comp}(t))$ in the analog domain. The transmit signal includes the unwanted spur minus the inverse spur signal. The error circuitry 240 generates a digital error signal e[n] based on the sniffed transmit signal, and inverse spur generation circuitry 250 generates a digital inverse spur signal $S_{comp}[n]$ that is injected into the transmit chain prior to the DAC of the analog processing circuitry 130. While at t=0, $S_{comp}(t)$ will be 0, after several iterations during which $S_{comp}(t)$ is built from sample to sample, $S_{comp}(t)$ will converge to a signal that approximates the unwanted spur in the transmit signal. In this manner, the spur cancelation system finds an "inverse spur" term and injects it with the right phase and gain into the transmit chain 210 such that the spur will be canceled out. The inverse spur signal or "inverse sinus" $S_{comp}[n]$ may be added at the DAC input as a compensation or correction term. Thus the correction term is "subtracted" inside the transmit chain 210 by an injector circuitry 270 so that error signal e[n] represents the error between the spur and the inverse spur signal.

The error circuitry 240 includes loopback circuitry 246 and filter circuitry 244. The loopback circuitry 246 samples and downconverts the analog transmit signal S(t)+spur to a digital signal that includes the wanted signal components as well as the spur. The filter circuitry 246 includes a narrow-band filter that rejects all but the energy in frequencies in close vicinity of the expected spur's frequency. Thus, the error signal e[n] excludes the wanted signal S(t) that does not depend on the phase and gain of the spur parameters (phase and gain) and thus does not effect on the minimization problem solved by an inverse spur circuitry 250. The frequency at which the spur is expected to occur may be determined a priori based on known characteristics of the transmit chain such as carrier frequency. Alternatively, the spur frequency may be measured by an external circuitry and provided to the filter circuitry 244 so that the filter circuitry 244 is controlled to pass an appropriate band of frequencies that surround the expected spur frequency.

The inverse spur circuitry 250 includes gradient circuitry 252, solution circuitry 254, and inverse spur generation circuitry 256. The gradient circuitry is configured to compute a gradient of a gain of the error signal (which contains the isolated spur signal) and a gradient of a phase of the error signal. As will be described in more detail below, the described exemplary solution circuitry 254 is configured to use the gradients to derive gain and phase coefficients $g_{est}[n]$ and $\varphi_{est}[n]$ used by the inverse spur generation circuitry 256 to generate the inverse spur signal $S_{comp}[n]$ that, when injected into the DAC input of the analog processing circuitry, minimizes the error signal e[n]. For example, the inverse spur generation circuitry may include a numerically controlled oscillator (NCO) that generates a sinus wave having the gain and phase expressed by the estimated gain and phase coefficients $g_{est}[n]$ and $\varphi_{est}[n]$.

The spur frequency $f_{spur}$ at which the spur is expected to occur may be determined a priori based on known characteristics of the transmit chain such as carrier frequency. Alternatively, the spur frequency may be measured by an external circuitry and provided to the gradient circuitry 252 and the inverse spur generation circuitry 256.

The spur signal has the general form:

$$g[n] \cdot \sin(2 \cdot \pi \cdot f \cdot n/f_{samp} + \varphi[n]) \qquad \text{EQ 1}$$

where g and $\varphi$ are unknown gain and phase.
The inverse spur signal has the general form:

$$g_{est}[n] \cdot \sin(2 \cdot \pi \cdot f \cdot n/f_{samp} + \varphi_{est}[n]) \qquad \text{EQ 2}$$

The solution circuitry 254 finds $g_{ent}$ and $\varphi_{est}$ using least mean squares (LMS) or any other adaptive or non-adaptive approach. Ideally, the solution circuitry 254 finds a value of $g_{est}$ that converges to the spur gain and a value of $\varphi_{est}$ that converges to the spur phase plus 180 degrees. In order to find the gain and phase of the spur, the solution circuitry 254 solves a minimization problem in which the spur energy (as represented by the error signal e[n]) is minimized.

The spur energy can be represented by:

$$e^2[n] = \left( \begin{array}{c} S[n] * F[n] + g[n] \cdot \sin\left(2 \cdot \pi \cdot f_{spur} \cdot \dfrac{n}{f_{samp}} + \varphi[n]\right) - \\ g_{est}(n) \cdot \sin\left(2 \cdot \pi \cdot f_{spur} \cdot \dfrac{n}{f_{samp}} + \varphi_{est}[n]\right) \end{array} \right)^2 \qquad \text{EQ 3}$$

The term S[n]*F[n] represents the transmit signal (i.e., signal encoding information to be transmitted) convolved with the narrow band filter F[n]. $f_{samp}$ is the sampling frequency and $f_{spur}$ is the spur frequency. As just discussed, $g_{est}$ and $\varphi_{est}$ are found by the solution circuitry 254 using a LMS technique (e.g., using two separate LMS for gain and phase) such that the additional terms (caused by the spur and the inverse spur signal) in the square error expression ($e^2(n)$) will be minimized (go to zero) and the spur will be canceled out.

The solution circuitry 254 may find the coefficients as follows. Recall that the goal is to find $g_{est}$ and $\varphi_{est}$ coefficients such that the square error ($e^2(n)$) will be minimized and the spur will be canceled out. The coefficients $g_{est}$ and $\varphi_{est}$ are found using LMS technique (two dimensional LMS): $e^2(n)$ is found according to each parameter:

$$g_{gradient}(n) = \qquad \text{EQ 4}$$

$$\dfrac{\partial e^2(n)}{\partial g} = 2 \cdot e(n) \cdot g(n) \cdot \sin(2 \cdot \pi \cdot f_{spur} \cdot n/f_{samp} + \varphi_{est}(n-1))$$

Where instead of $\varphi$ the last phase-LMS $\varphi_{est}(n-1)$ is substituted. Then, the gain-LMS is determined according to:

$$g_{est}(n) = g_{est}(n-1) - \mu_{gain} \cdot g_{gradient}(n) \qquad \text{EQ 5}$$

Similarly the phase-LMS is determined according to:

$$\varphi_{gradient}(n) = \qquad \text{EQ 6}$$

$$\dfrac{\partial e^2(n)}{\partial \varphi} = 2 \cdot e(n) \cdot g_{est}(n-1) \cdot \cos(2 \cdot \pi \cdot f_{spur} \cdot n/f_{samp} + \varphi_{est}(n-1))$$

Where instead of $\varphi$ the last phase-LMS $\varphi_{est}(n-1)$ is substituted and instead of the last gain-LMS $g_{est}(n-1)$ is substituted.

Then, the phase-LMS is determined according to:

$$\varphi_{est}(n) = \varphi_{est}(n-1) - \mu_{phi} \cdot \varphi_{gradient}(n)$$

The idea of this approach is that if the square error $e^2(n)$ gradient is positive, it implies that error e(n) would keep increasing positively if the same weight ($g_{est}$) is used for further iterations. This means the weight ($g_{est}$) should be reduced. The same principle holds for the weight $\varphi_{est}(n)$.

While the methods are illustrated and described below as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the disclosure herein. Also, one or more of the acts depicted herein may be carried out in one or more separate acts and/or phases.

Figure 3:
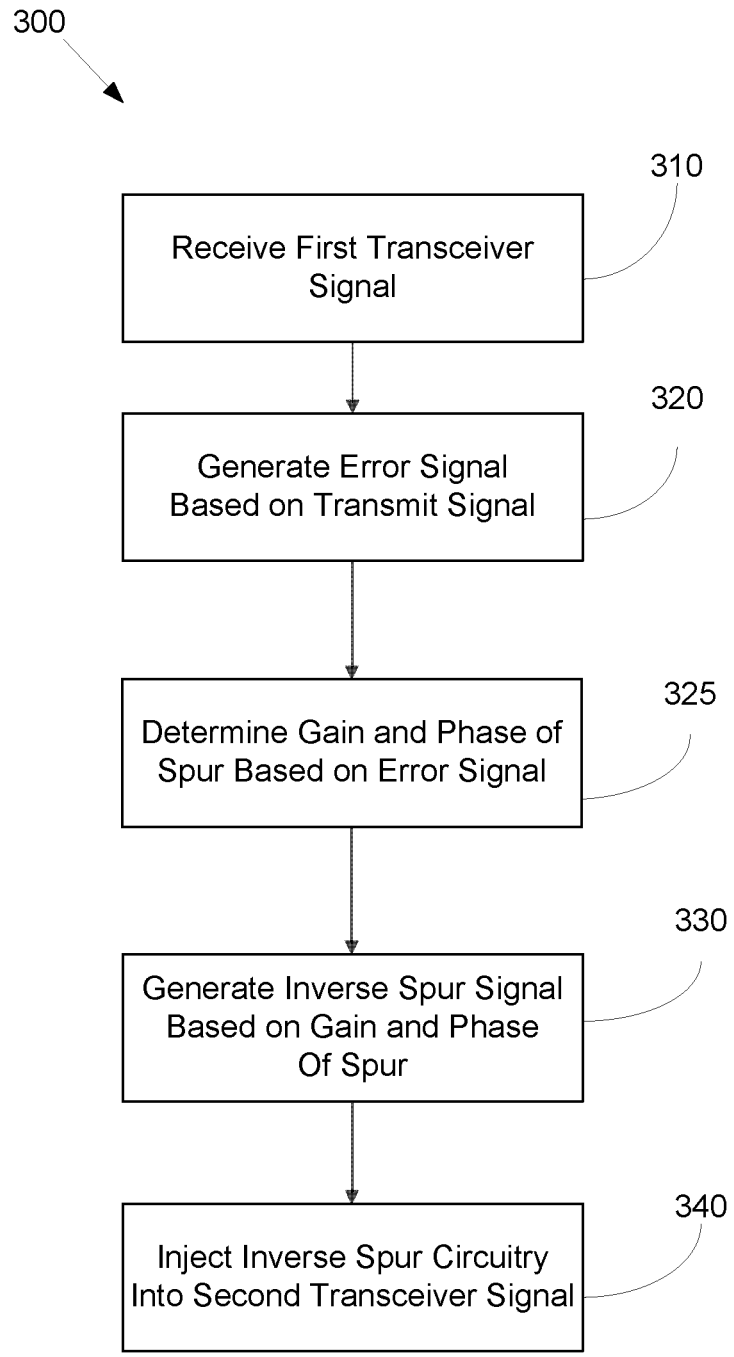
FIG. 3 illustrates a flowchart that outlines an exemplary method for canceling a spur from a signal by generating an inverse spur signal.

FIG. 3 depicts a flowchart outlining one embodiment of a method 300 for canceling a spur from a transceiver signal. The method 300 may be performed, for example, by the inverse spur system of FIGS. 1-2. A first transceiver signal is received at 310. At 320, the method includes generating an error signal based at least on the first transceiver signal. A gain and phase of a spur in the transmit signal is determined based at least on the error signal at 325. At 330, the method includes generating an inverse spur signal based at least on the determined gain and phase of the spur. The inverse spur signal is injected into a second transceiver signal at 340. In this manner, the second transceiver signal is corrected to cancel the effects of an expected spur.

It can be seen from the foregoing description that the disclosed systems, devices, and methods provide effective spur cancelation by generating an inverse spur signal that approximates an expected spur. The disclosed systems, devices, and methods may be implemented in the digital domain, increasing performance and minimizing degradation of the wanted signal.

Figure 4:
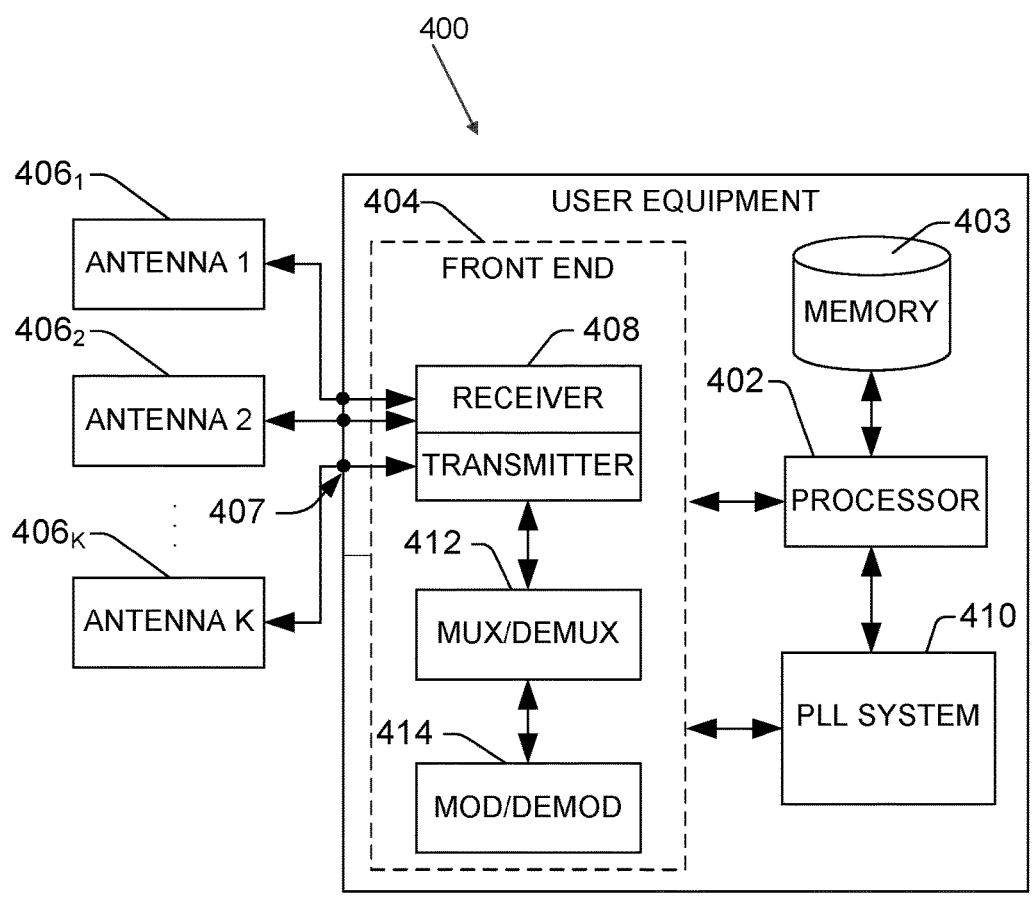
FIG. 4 illustrates an example user equipment device that includes a transmitter front end that includes an inverse spur system in accordance with various aspects described.

To provide further context for various aspects of the disclosed subject matter, FIG. 4 illustrates a block diagram of an embodiment of user equipment 400 (e.g., a mobile device, communication device, personal digital assistant, etc.) related to access of a network (e.g., base station, wireless access point, femtocell access point, and so forth) that can enable and/or exploit features or aspects of the disclosed aspects.

The user equipment or mobile communication device 400 can be utilized with one or more aspects of the spur cancelation circuitry described herein according to various aspects. The user equipment device 400, for example, comprises a digital baseband processor 402 that can be coupled to a data store or memory 403, a front end 404 (e.g., an RF front end, an acoustic front end, or the other like front end) and a plurality of antenna ports 407 for connecting to a plurality of antennas 406₁ to 406k (k being a positive integer). The antennas 406₁ to 406k can receive and transmit signals to and from one or more wireless devices such as access points, access terminals, wireless ports, routers and so forth, which can operate within a radio access network or other communication network generated via a network device (not shown).

The user equipment 400 can be a radio frequency (RF) device for communicating RF signals, an acoustic device for communicating acoustic signals, or any other signal communication device, such as a computer, a personal digital assistant, a mobile phone or smart phone, a tablet PC, a modem, a notebook, a router, a switch, a repeater, a PC, network device, base station or a like device that can operate to communicate with a network or other device according to one or more different communication protocols or standards.

The front end 404 can include a communication platform, which comprises electronic components and associated circuitry that provide for processing, manipulation or shaping of the received or transmitted signals via one or more receivers or transmitters (e.g. transceivers) 408, a mux/demux component 412, and a mod/demod component 414. The front end 404 is coupled to the digital baseband processor 402 and the set of antenna ports 407, in which the set of antennas 406₁ to 406k can be part of the front end. In one aspect, the user equipment device 400 can comprise a phase locked loop system 410.

The processor 402 can confer functionality, at least in part, to substantially any electronic component within the mobile communication device 400, in accordance with aspects of the disclosure. As an example, the processor 400 can be configured to execute, at least in part, executable instructions that generate the inverse spur signal as described in FIGS. 1-2. The processor 400 may embody various aspects of the error circuitry, inverse spur circuitry, and so on, of FIGS. 1-2 as a multi-mode operation chipset that affords intermodulation distortion cancelation in a receiver.

The processor 402 is functionally and/or communicatively coupled (e.g., through a memory bus) to memory 403 in order to store or retrieve information necessary to operate and confer functionality, at least in part, to communication platform or front end 404, the phase locked loop system 410 and substantially any other operational aspects of the phase locked loop system 410. The phase locked loop system 410 includes at least one oscillator (e.g., a VCO, DCO or the like) that can be calibrated via core voltage, a coarse tuning value, signal, word or selection process according the various aspects described herein.

The processor 402 can operate to enable the mobile communication device 400 to process data (e.g., symbols, bits, or chips) for multiplexing/demultiplexing with the mux/demux component 412, or modulation/demodulation via the mod/demod component 414, such as implementing direct and inverse fast Fourier transforms, selection of modulation rates, selection of data packet formats, inter-packet times, etc. Memory 403 can store data structures (e.g., metadata), code structure(s) (e.g., modules, objects, classes, procedures, or the like) or instructions, network or device information such as policies and specifications, attachment protocols, code sequences for scrambling, spreading and pilot (e.g., reference signal(s)) transmission, frequency offsets, cell IDs, and other data for detecting and identifying various characteristics related to RF input signals, a power output or other signal components during power generation.

While the invention has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention.

Examples can include subject matter such as a method, means for performing acts or blocks of the method, at least one machine-readable medium including instructions that, when performed by a machine cause the machine to perform acts of the method or of an apparatus or system for concurrent communication using multiple communication technologies according to embodiments and examples described herein.

Example 1 is a spur cancelation system that includes error circuitry, inverse spur circuitry, and injection circuitry. The error circuitry is configured to generate an error signal based at least on a first transceiver signal in a transceiver signal processing chain. The inverse spur circuitry is configured to, based at least on the error signal, determine a gain and a phase of a spur signal in the first transceiver signal and generate an inverse spur signal based at least on the gain and the phase of the spur signal. The injection circuitry is configured to inject the inverse spur signal and cancel a spur in a second transceiver signal in the transceiver signal processing chain.

Example 2 includes the subject matter of example 1, including or omitting optional elements, wherein the error circuitry includes filter circuitry configured to filter the first transceiver signal to remove signal components outside a frequency range of an expected spur in the first transceiver signal.

Example 3 includes the subject matter of example 1, including or omitting optional elements, wherein the first transceiver signal includes an analog signal and further wherein the error circuitry includes loopback circuitry configured to downconvert the first transceiver signal to a baseband frequency.

Example 4 includes the subject matter of example 1, including or omitting optional elements, wherein the second transceiver signal includes an analog receive signal in a receiver signal processing chain, further wherein the injection circuitry includes a digital to analog converter (DAC)

configured to convert the inverse spur signal to an analog signal prior to injecting the inverse spur signal into the analog receive signal.

Example 2 includes the subject matter of examples 1-4, including or omitting optional elements, wherein the inverse spur circuitry includes gradient circuitry, solution circuitry, and inverse spur generation circuitry. The gradient circuitry is configured to compute a gradient of a gain of the error signal and a gradient of a phase of the error signal. The solution circuitry is configured to derive an estimated gain coefficient and an estimated phase coefficient based at least on the gradient of the gain and the gradient of the phase. The inverse spur generation circuitry is configured to generate a digital inverse spur signal based at least on the estimated gain coefficient and the estimated phase coefficient.

Example 6 includes the subject matter of example 5, including or omitting optional elements, wherein the inverse spur generation circuitry includes a numerically controlled oscillator configured to generate a sinus wave having the gain and the phase of the spur signal.

Example 7 includes the subject matter of examples 1-4, including or omitting optional elements, wherein: the first transceiver signal includes an analog transmit signal in a transmit signal processing chain; the error circuitry is configured to convert the analog transmit signal to a digital error signal; the inverse spur circuitry generates a digital inverse spur signal; and the second transceiver signal includes a digital transmit signal in the transmit signal processing chain.

Example 8 includes the subject matter of examples 1-4, including or omitting optional elements, wherein: the first transceiver signal includes an analog receive signal in a receive signal processing chain; the error circuitry is configured to convert the analog receive signal to a digital error signal; the inverse spur circuitry generates a digital inverse spur signal and converts the digital inverse spur signal to an analog inverse spur signal; and the second transceiver signal includes an analog receive signal in the receive signal processing chain.

Example 9 includes the subject matter of examples 1-4, including or omitting optional elements, wherein the injection circuitry is configured to combine the inverse spur signal with the second transceiver signal.

Example 10 is a method configured to cancel spurs that includes: generating an error signal based at least on a first transceiver signal in a transceiver signal processing chain; based at least on the error signal, determining a gain and a phase of a spur signal in the first transceiver signal; generating an inverse spur signal based at least on the gain and the phase of the spur signal; and injecting the inverse spur signal with a second transceiver signal in the transceiver signal processing chain.

Example 11 includes the subject matter of example 10, including or omitting optional elements, further including generating the error signal by filtering the first transceiver signal to remove signal components outside a frequency range of the spur signal.

Example 12 includes the subject matter of example 10, including or omitting optional elements, further including generating the error signal by down converting the first transceiver signal to a baseband frequency.

Example 13 includes the subject matter of example 10, including or omitting optional elements, further including converting the inverse spur signal to an analog signal prior to injecting the inverse spur signal with an analog receive signal.

Example 14 includes the subject matter of examples 10-13, including or omitting optional elements, further including: computing a gradient of a gain of the error signal and a gradient of a phase of the error signal; deriving an estimated gain coefficient and an estimated phase coefficient based at least on the gradient of the gain and the gradient of the phase; and generating a digital inverse spur signal based at least on the estimated gain coefficient and the estimated phase coefficient.

Example 15 is a transceiver including a signal processing chain configured to process a signal and inverse spur circuitry. The inverse spur circuitry is configured to: generate an inverse spur signal that approximates an expected spur in the signal and inject the inverse spur signal into the signal processing chain to cancel the expected spur from the signal.

Example 16 includes the subject matter of example 15, including or omitting optional elements, further including error circuitry configured to generate an error signal based at least on the signal. The inverse spur circuitry is configured to, based at least on the error signal, determine a gain and a phase of a spur in the signal and generate the inverse spur signal based at least on the gain and the phase of the spur.

Example 17 includes the subject matter of example 16, including or omitting optional elements, wherein the error circuitry includes filter circuitry configured to filter the signal to remove signal components outside a frequency range of the expected spur.

Example 18 includes the subject matter of example 16, including or omitting optional elements, wherein the error circuitry includes loopback circuitry configured to down-convert the signal to a baseband frequency.

Example 19 includes the subject matter of examples 16-18, including or omitting optional elements, wherein the inverse spur circuitry includes: gradient circuitry configured to compute a gradient of a gain of the error signal and a gradient of a phase of the error signal; solution circuitry configured to derive an estimated gain coefficient and an estimated phase coefficient based at least on the gradient of the gain and the gradient of the phase; and inverse spur generation circuitry configured to generate a digital inverse spur signal based at least on the estimated gain coefficient and the estimated phase coefficient.

Example 20 includes the subject matter of example 19, including or omitting optional elements, wherein the inverse spur generation circuitry includes a numerically controlled oscillator configured to generate a sinus wave having the gain and the phase of the spur.

Example 21 includes the subject matter of example 19, wherein the solution circuitry is configured to derive the estimated gain coefficient and the estimated phase coefficient using a least mean squares (LMS) algorithm.

Example 22 is an apparatus, that includes: means for generating an error signal based at least on a first transceiver signal in a transceiver signal processing chain; means for determining a gain and a phase of a spur signal in the first transceiver signal based at least on the error signal; means for generating an inverse spur signal based at least on the gain and the phase of the spur signal; and means for injecting the inverse spur signal into the transceiver signal processing chain.

Example 23 includes the subject matter of example 22, including or omitting optional elements, wherein the means for generating the error signal includes means for filtering the first transceiver signal to remove signal components outside a frequency range of the spur signal.

Example 24 includes the subject matter of examples 22-23, including or omitting optional elements, further including: means for computing a gradient of a gain of the error signal and a gradient of a phase of the error signal; means for deriving an estimated gain coefficient and an estimated phase coefficient based at least on the gradient of the gain and the gradient of the phase; and means for generating a digital inverse spur signal based at least on the estimated gain coefficient and the estimated phase coefficient.

Various illustrative logics, logical blocks, modules, and circuits described in connection with aspects disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor can be a microprocessor, but, in the alternative, processor can be any conventional processor, controller, microcontroller, or state machine.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature may have been disclosed with respect to only one of several implementations, such feature may be combined with one or more other features of the other implementations as may be desired and advantageous for any given or particular application.

The invention claimed is:

1. A spur cancelation system, comprising:
an error circuitry configured to generate an error signal based at least on a first transceiver signal in a transceiver signal processing chain;
an inverse spur circuitry configured to determine a gain and a phase of a spur in the first transceiver signal and generate a digital inverse spur signal based at least on the gain and the phase of the spur signal, the inverse spur circuitry comprising:
a gradient circuitry configured to compute a gradient of a gain of the error signal and a gradient of a phase of the error signal;
a solution circuitry configured to derive an estimated gain coefficient and an estimated phase coefficient based at least on the gradient of the gain and the gradient of the phase; and
an inverse spur generation circuitry configured to generate a digital inverse spur signal based at least on the estimated gain coefficient and the estimated phase coefficient; and
an injection circuitry configured to inject the digital inverse spur signal and cancel a spur in a second transceiver signal in the transceiver signal processing chain.

2. The spur cancelation system of claim 1, wherein the error circuitry comprises filter circuitry configured to filter the first transceiver signal to remove signal components outside a frequency range of an expected spur in the first transceiver signal.

3. The spur cancelation system of claim 1, wherein the first transceiver signal comprises an analog signal and wherein the error circuitry comprises loopback circuitry configured to downconvert the first transceiver signal to a baseband frequency.

4. The spur cancelation system of claim 1, wherein the second transceiver signal comprises an analog receive signal in a receiver signal processing chain, further wherein the injection circuitry comprises a digital to analog converter (DAC) configured to convert the inverse spur signal to an analog signal prior to injecting the inverse spur signal into the analog receive signal.

5. The spur cancelation system of claim 1, wherein the inverse spur generation circuitry comprises a numerically controlled oscillator configured to generate a sinus wave having the gain and the phase of the spur signal.

6. The spur cancelation system of claim 1, wherein:
the first transceiver signal comprises an analog transmit signal in a transmit signal processing chain;
the error circuitry is configured to convert the analog transmit signal to a digital error signal;
the second transceiver signal comprises a digital transmit signal in the transmit signal processing chain.

7. The spur cancelation system of claim 1, wherein:
the first transceiver signal comprises an analog receive signal in a receive signal processing chain;
the error circuitry is configured to convert the analog receive signal to a digital error signal;
the inverse spur circuitry converts the digital inverse spur signal to an analog inverse spur signal; and
the second transceiver signal comprises an analog receive signal in the receive signal processing chain.

8. The spur cancelation system of claim 1, wherein the injection circuitry is configured to combine the inverse spur signal with the second transceiver signal.

9. A method, comprising:
generating an error signal based at least on a first transceiver signal in a transceiver signal processing chain;
based at least on the error signal, determining a gain and a phase of a spur signal in the first transceiver signal and generating a digital inverse spur signal based at least on the gain and the phase of the spur signal by:
computing a gradient of a gain of the error signal and a gradient of a phase of the error signal;
deriving an estimated gain coefficient and an estimated phase coefficient based at least on the gradient of the gain and the gradient of the phase; and generating a digital inverse spur signal based at least on the estimated gain coefficient and the estimated phase coefficient; and injecting the digital inverse spur signal into the transceiver signal processing chain.

10. The method of claim 9, further comprising generating the error signal by filtering the first transceiver signal to remove signal components outside a frequency range of the spur signal.

11. The method of claim 9, further comprising generating the error signal by down converting the first transceiver signal to a baseband frequency.

12. The method of claim 9, further comprising converting the inverse spur signal to an analog signal prior to injecting the inverse spur signal into an analog receive signal.

13. A transceiver comprising:
a signal processing chain configured to process a signal;
error circuitry configured to generate an error signal based at least on the signal;
an inverse spur circuitry, comprising:
    a gradient circuitry configured to compute a gradient of a gain of the error signal and a gradient of a phase of the error signal;
    a solution circuitry configured to derive an estimated gain coefficient and an estimated phase coefficient based at least on the gradient of the gain and the gradient of the phase; and
    an inverse spur generation circuitry configured to generate a digital inverse spur signal based at least on the estimated gain coefficient and the estimated phase coefficient; and
an injection circuitry configured to inject the digital inverse spur signal into the signal processing chain to cancel an expected spur from the signal.

14. The transceiver of claim 13, wherein the error circuitry comprises a filter circuitry configured to filter the signal to remove signal components outside a frequency range of the spur.

15. The transceiver of claim 13, wherein the error circuitry comprises loopback circuitry configured to downconvert the signal to a baseband frequency.

16. The transceiver of claim 13, wherein the inverse spur generation circuitry comprises a numerically controlled oscillator configured to generate a sinus wave having the gain and the phase of the spur.

17. The transceiver of claim 13, wherein the solution circuitry is configured to derive the estimated gain coefficient and the estimated phase coefficient using a least mean squares (LMS) algorithm.

* * * * *